US009272784B2

(12) United States Patent
Nelson (10) Patent No.: US 9,272,784 B2
(45) Date of Patent: Mar. 1, 2016

(54) VERTICAL TAKEOFF WINGED MULTICOPTER

(71) Applicant: Brian Dale Nelson, Birchwood, MN (US)

(72) Inventor: Brian Dale Nelson, Birchwood, MN (US)

(73) Assignee: Brian Dale Nelson, Birchwood, MN (US)

( * ) Notice: Subject to any disclaimer, the term of this patent is extended or adjusted under 35 U.S.C. 154(b) by 389 days.

(21) Appl. No.: 14/281,862

(22) Filed: May 19, 2014

(65) Prior Publication Data

US 2015/0329204 A1    Nov. 19, 2015

(51) Int. Cl.
*B64C 27/08* (2006.01)
*B64C 39/02* (2006.01)

(52) U.S. Cl.
CPC ......... *B64C 39/024* (2013.01); *B64C 2201/021* (2013.01); *B64C 2201/024* (2013.01); *B64C 2201/107* (2013.01); *B64C 2201/108* (2013.01)

(58) Field of Classification Search
USPC .......... 244/17.23, 17.11, 6, 10, 17.25; 446/36
See application file for complete search history.

(56) References Cited

U.S. PATENT DOCUMENTS

| | | | | |
|---|---|---|---|---|
| 6,119,976 A * | 9/2000 | Rogers | ................... | B64C 39/024 244/13 |
| 7,364,114 B2 * | 4/2008 | Wobben | ................... | B64C 27/20 244/12.3 |
| 8,292,215 B2 * | 10/2012 | Olm | ................... | B64C 1/30 244/17.23 |
| 8,721,383 B2 * | 5/2014 | Woodworth | ............ | B64C 15/00 244/12.4 |
| 8,931,730 B2 * | 1/2015 | Wang | ................... | B64C 39/028 244/100 R |
| 9,061,763 B1 * | 6/2015 | Christensen | ........... | A63H 17/28 |
| 9,199,733 B2 * | 12/2015 | Keennon | ................ | B64C 27/12 244/17.11 |
| 2006/0226281 A1 * | 10/2006 | Walton | ................ | B64C 29/0033 244/17.23 |
| 2012/0298793 A1 * | 11/2012 | Weddendorf | ............ | F03D 1/02 244/17.23 |
| 2015/0136897 A1 * | 5/2015 | Seibel | ................ | B64C 29/0033 244/6 |

* cited by examiner

*Primary Examiner* — Christopher P Ellis (57) ABSTRACT

An unmanned aerial vehicle (UAV) comprising a plurality of propeller drives rigidly mounted to a foldable frame with the motor rotors aligned in a vertical direction to provide a means of vertical takeoffs and landings. The foldable frame mounts a sheet sail at an angle with the horizontal that provides lift during the forward motion and tilt of the UAV. In one embodiment the shape of the sheet sail and frame are triangular with one or two propeller drives being mounted in close proximity to each of the three vertices. In another embodiment, the shape of the sheet sail and frame are triangular with one or two propeller drives being mounted in close proximity to each of the three vertices, and one or two propeller drives being mount in close proximity to the trailing edge of the spine, in between the trailing edge propeller drives. In some embodiments, the frame spars may be comprised of carbon fiber rods and the sheet sail may be comprised of ripstop nylon fabric.

4 Claims, 7 Drawing Sheets

VERTICAL TAKEOFF WINGED MULTICOPTER

Embodiments of the invention relate generally to Unmanned Aerial Vehicles (UAVs), personal drones, and, more particularly to multicopters with various configurations of rotary propeller drives and to fixed wing planes and combinations thereof.

BACKGROUND

An Unmanned Aerial Vehicle (UAV), commonly referred to as a drone, is an aircraft without a human pilot. It is controlled either by remote control using a radio signal, or, autonomously using an onboard computer system. UAVs are commonly used in military operations where missions are often too hazardous to deploy manned aircraft.

The use of personal drones has become increasingly popular over the last few years. Manufacturers have developed a wide variety of multicopters with three or more rotary propellers that are used for lift and propulsion, with the most popular version being a four rotor quadcopter. Advances in microelectromechancial system (MEMS) gyroscopes and accelerometers have allowed onboard computers to autonomously sense and control the pitch, roll, and yaw of these rotary multicopters. Some advanced personal drones are also equipped with global positioning systems (GPS) and compass microcircuits that allow the onboard computer to fly autonomously between preprogrammed waypoints. These systems also allow the multicopters to return safely to a home position given a low battery or lost telemetry signal situation. Multicopters are often equipped with a camera system for aerial photography. The main advantage of a multicopter its flight maneuverability including vertical takeoffs, landings, and the ability to hover in a fixed position. The main limitation of a multicopter is its limited flight time due to battery charge limitations. The typical flight time for a personal multicopter drone is 5-15 minutes.

Another common type of personal drone is a rotary propeller powered fixed wing plane. Fixed wing planes typically cost more than multicopters because they require servos and linkages to actuate flight control surfaces such as ailerons, a rudder, and an elevator. Fixed wing drones can be equipped with all of the sensors and onboard computers used by multicopters for autonomous flight. The main advantage of fixed wing planes is their longer flight time, typically 30-60 minutes on a battery charge. Flight time is extended because the wings provide lift. The main disadvantage of fixed wing planes is their limited flight maneuverability. Because they require a forward thrust to provide lift, they cannot perform vertical takeoffs and landings, and they cannot hover in a fixed position in space.

There are personal drones that integrate a multicopter platform with a fixed wing aircraft design. These personal drones typically use four propeller drives oriented in the vertical position for vertical takeoff capability. Once at cruising attitude, motorized mechanisms rotate the propeller drives towards the horizontal position and the aircraft functions as a fixed wing plane. These hybrid drones are costly because they require additional motors and linkages to tilt multiple propeller drives. These drones are often quite large because of their fixed wingspans, making them difficult to store and transport.

SUMMARY

The embodiments of the invention provide the vertical takeoff and hovering capability of multicopters with the extended flight times and maneuverability of fixed wing aircraft, without any additional motors and linkages to rotate propellers drives, or to actuate flight control surfaces.

The added cost and complexity of a conventional fixed wing plane design using servos and linkages to control flight control surfaces is not required because pitch, roll, yaw and forward thrust are all enabled using the multiple vertically mounted propeller drives by the same means as a multicopter.

The added cost and complexity of using motors and linkages to rotate multiple propeller drives in a fixed wing personal drone from a vertical to horizontal thrust direction as a means of providing vertical takeoffs is not required with the invention. The invention, along with conventional multicopters, move forward by tilting the aircraft frame and the subsequent propeller thrust vector (e.g., 1-30 degrees from horizontal), towards the direction of forward motion. The invention angles the wing control surface from horizontal so that it provides lift and minimal drag in this tilted forward thrust position.

To further reduce cost, weight, and complexity, the invention uses a wing comprised of a lightweight rigid frame (e.g. carbon, aluminum, or fiberglass tubing or rods) that supports a sheet sail (e.g. ripstop nylon fabric) such as those found in many kite designs.

A further advantage of the invention is the ability to fold into a compact size. This is a major advantage in transporting the personal drone, as fixed wing designs can be large in size, with wings that often span 3-5 feet. By removing the spreader spars, the fabric sail and leading edge spars can be rotated together to form a compact shape for easy transport and storage.

The placement and quantity of the propeller drives can vary; typically the number of propeller drives is an even number so that the propellers can spin in opposing directions to cancel out any resultant torsional forces on the vehicle. Additional propeller drives typically provide additional lift to enable heavier payloads to be carried.

In one embodiment, the frame of the invention is triangular in shape and the sheet sail forms a delta wing. One or two propeller drives are mounted in close proximity to the leading edge vertex of the delta wing, and one or two propeller drives are mounted at each of the trailing edge vertices.

In another embodiment, the frame of the invention is triangular in shape and the sheet sail forms a delta wing. One or two propeller drives are mounted in close proximity to each of the three triangular vertices, and one or two propeller drives are mounted in close proximity to the trailing end of the spine spar, in between the two trailing vertices.

The above summary is not intended to describe each embodiment or every implementation of the invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The invention will be further described with reference to the figures of the drawing, wherein.

The figures are rendered primarily for clarity and are not necessarily drawn to scale. Moreover, various structure/components, including but not limited to fasteners, electrical components (wiring, cables, etc.), and the like, may be removed from some or all of the views where inclusion of such structure/components is not necessary to understand the various exemplary embodiments of the invention.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced.

Embodiments of the invention are directed generally to Unmanned Aerial Vehicles (UAVs) also referred to herein as "personal drones". While the embodiments of this invention use a triangular, delta wing configuration, other wing shapes may be used without departing from the scope of the invention.

It is understood that individual parts may be assembled by several different means including, but not limited to, screws, bolts, adhesives, pins, retaining rings, press fits etc. without departing from the scope of the invention.

For simplicity, the wiring between electrical components and the motor drives has been eliminated. It is understood that all of the electrical components are connected by some form of wiring.

Figure 1:
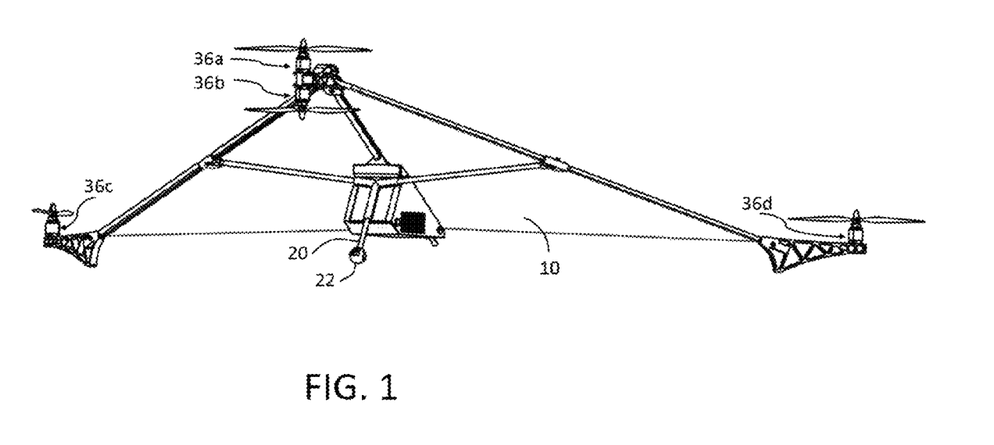
FIG. 1 is a front isometric view of the vertical takeoff winged multicopter in accordance with one embodiment of the invention.
Figure 2:
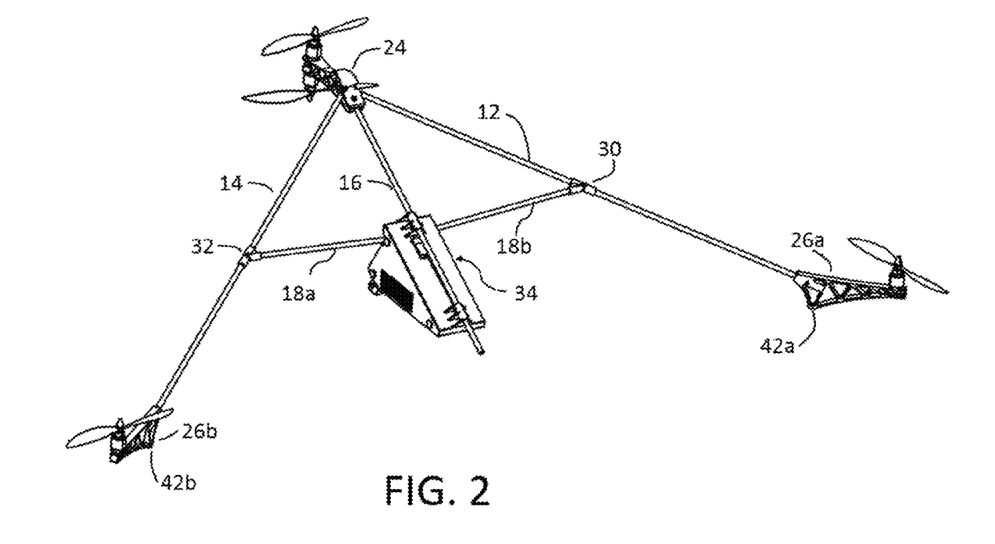
FIG. 2 is a rear isometric view of the vertical takeoff winged multicopter, with the sheet sail removed for clarity.

FIG. 1 and FIG. 2 are front and rear isometric views of one embodiment of the invention. The frame spars 12, 14, 16, 18a and 18b form a triangular frame that supports a sheet sail 10 wing. In one embodiment the spars may consist of pultruded carbon tubes distributed by Goodwinds and be approximately 0.375 inches in diameter. Propeller drives 36a-d are mounted near the vertices of the triangular frame.

Propeller drive 36a is rigidly attached to front motor mount 24 and propeller drive 36b is rigidly attached to front motor mount 24 along the same axis. The propeller drives 36a and 36b spin in opposite directions in order to cancel out any net torsional forces, and the propellers are mounted as a means to provide thrust in the same upward direction.

Propeller drive 36c is attached to side motor mount 26a, and propeller drive 36d is attached to side motor mount 26b. Both of these drives are aligned as a means to provide thrust in the same upward direction and they spin in opposite directions to cancel out any net torsional forces on the invention.

The front motor mount 24 is pivotally attached to the right leading edge spar 12, and the left leading edge spar 14. The front motor mount 24 is rigidly fixated to the spine spar 16. The electronics assembly 34 is rigidly fixated to the spine spar 16 and stabilized by rigid fixations to the spreader spars 18a and 18b. The motor mounts may be comprised of injection molded plastic, 3D printed plastic, or made of a lightweight cast material.

Figure 3:
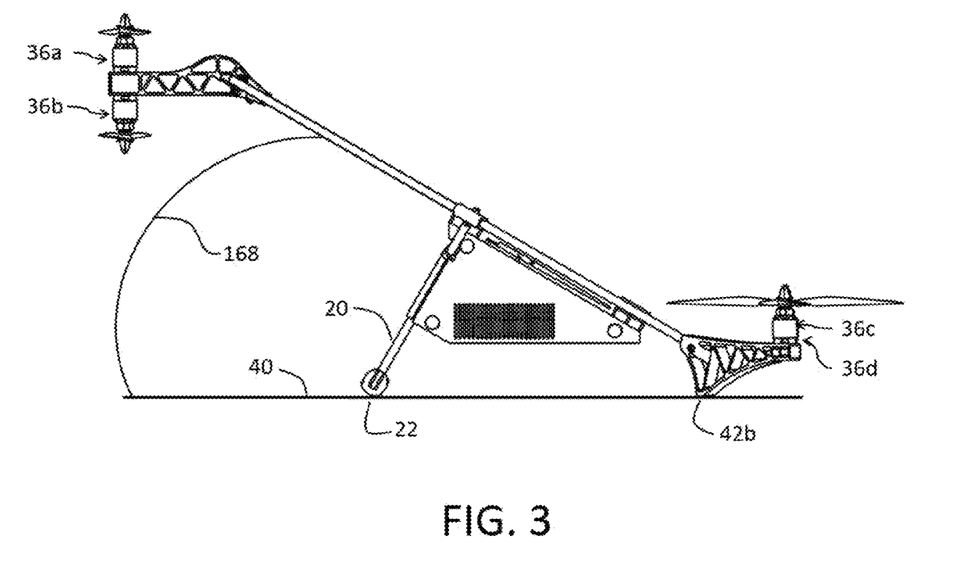
FIG. 3 is a front view of the vertical takeoff winged multicopter as it sits on the ground prior to flight.

FIG. 3 is a front view of the invention as it sits on the ground prior to flight. All of the propeller drives 36a-36d have motor rotor axes aligned in the vertical direction which provides a means of vertical takeoff in the same manner as conventional multicopters. The invention rests on three points, the foot 22, and the two foot pad features 42a and 42b on the side mounts 26a and 26b respectively. In one embodiment, the foot 22 is a plastic part assembled to the foot spar 20. The frame spars 12, 14, and 16 are angled relative the ground plane 40. The sheet sail 10 follows this frame angle and forms the sheet sail design angle from horizontal 168 (e.g., 10 to 70 degrees).

Figure 4:
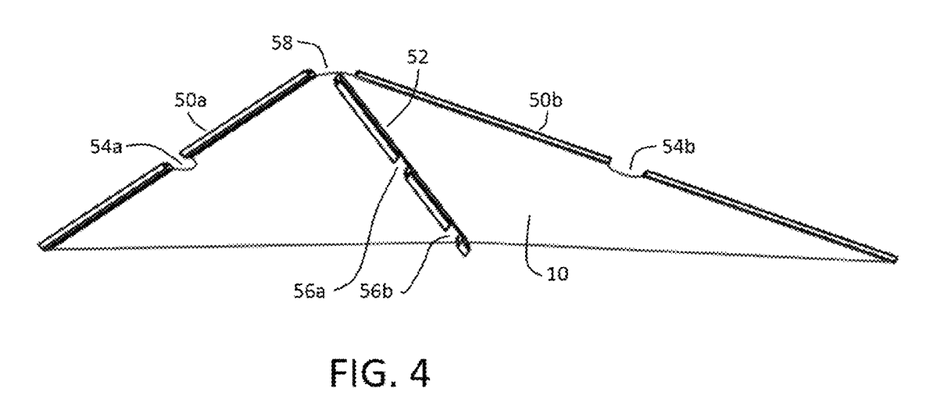
FIG. 4 is a front isometric view of the sheet sail.

FIG. 4 is a front isometric view of the sheet sail 10. In one embodiment the sheet sail is comprised of ripstop nylon fabric. The seams 50, 52a and 52b may be sewn into the fabric sheet sail 10. The right leading edge spar 12 (as shown in FIG. 2) passes through the right leading edge seam 50a, the left leading edge spar 14 passes through the left leading edge seam 50b and the spine spar 16 passes through the spine seam 52 which captivates the sheet sail 10 to the frame. The seams 50, 52a and 52b offer a convenient passage to route the wires that travel between the electronics assembly 34 and the propeller drives.

A front motor mount cutout 58 provides clearance in the sheet sail 10 for the front motor mount 24. A right spreader connector cutout 54a provides clearance in the sheet sail 10 for the right spreader connector 30, and the left spreader connector cutout 54b provides clearance in the sheet sail 10 for the left spreader connector 32. Additional cutouts 56a and 56b are cutouts in the spine seam 52 to provide clearance for connections to the electronics assembly 34.

Figure 5:
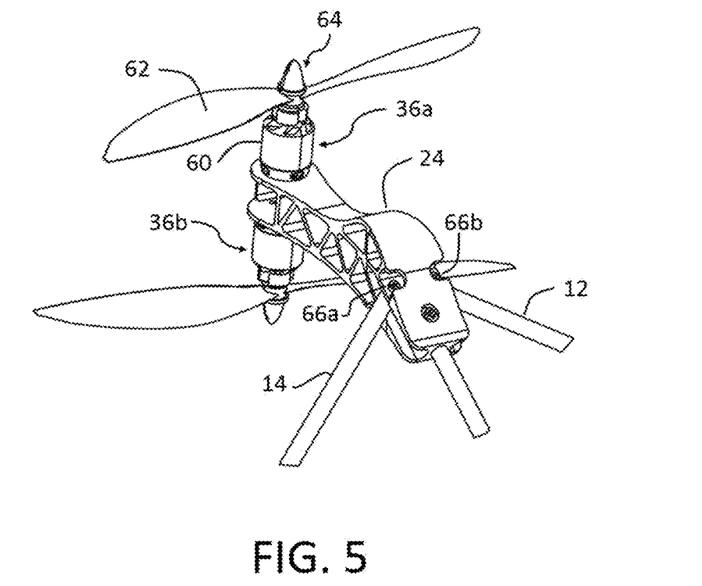
FIG. 5 is an enlarged rear isometric view of the front motor mount.

FIG. 5 is an enlarged rear isometric view of the front motor mount 24. The propeller drives 36a, 36b, 36c and 36d are comprised of an electric motor 60, a propeller 62, and a propeller nut assembly 64. The high torque, direct current motor 24 is designed specifically for personal multicopters (e.g., 850 KV AC2830-358 distributed by 3D Robotics). The slow fly propeller 62 is designed for personal multicopters using electric motors (e.g., APC 10×47 Push Pull Propeller Set distributed by 3D Robotics). The left leading edge spar 14 pivots about pivot point 66a, and the right leading edge spar 12 pivots about pivot point 66b.

Figure 6:
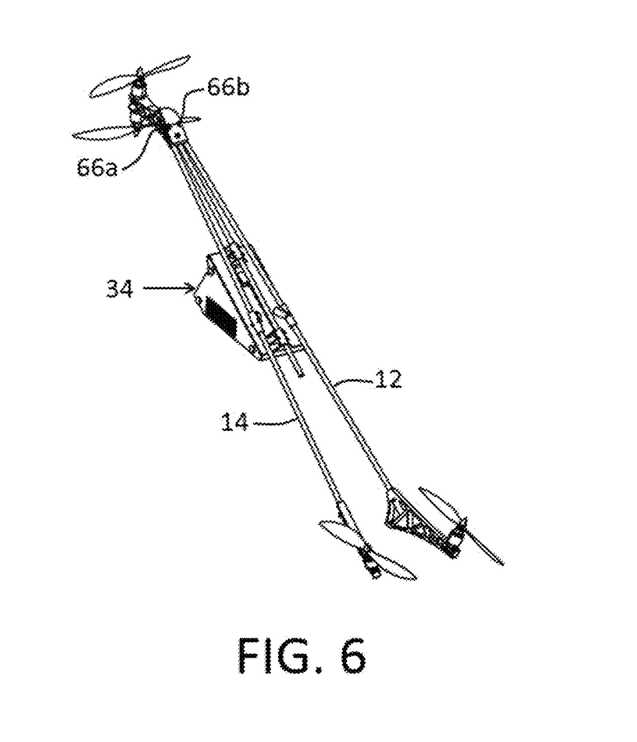
FIG. 6 is a rear isometric view of the vertical takeoff winged multicopter in a folded position with the sheet sail removed for clarity.

FIG. 6 is a rear isometric view of the vertical takeoff winged multicopter in a folded position with the sheet sail removed for clarity. Once the spreader spars 18a and 18b (see FIG. 2) are removed, the left leading edge spar 14 and the right leading edge spar 12 are free to pivot inward about pivot points 66a and 66b respectively. The leading edge spars 14 and 12 rest on top of the electronics assembly 34. The sheet sail 10 (not shown) collapses into the compact shape shown in FIG. 6 for easy storage and transport.

Figure 7:
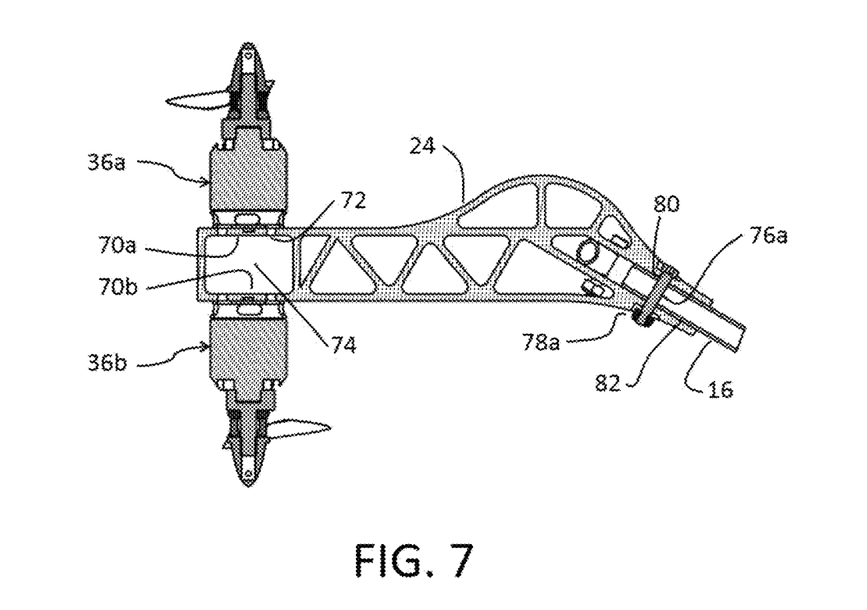
FIG. 7 is an enlarged front section view of the front motor mount.

FIG. 7 is an enlarged front section view of the front motor mount 24. The propeller drive 36a is assembled to the front motor mount wall 70a using two threaded fasteners (not shown) through holes 72. The propeller drive 36b is assembled to the front motor mount wall 70b using two threaded fasteners (not shown) through holes 72. The mounting bolt window 74 must have a sufficient height and width to allow a threaded fastener (not shown) to be inserted into the window, and then be inserted into holes 72, and then to be secured by turning and tightening it from a hand tool (e.g., wrench) inserted into the window. In one embodiment the fastener is a hexagon headed threaded fastener and the tightening hand tool is a box wrench.

The front motor mount 24 is fixated to the spine spar 16 by inserting it into a receiving hole 82. The spine spar is further secured by inserting a shoulder screw 76a through a cross hole 80 whose axis is approximately normal to the receiving hole 82 axis. The shoulder screw 76a is secured using a locking nut 78a. The shoulder screw 76a and locking nut 78a are also used to create the pivot points 66a and 66b shown in FIG. 5, along with all other connections between the spars and motor mounts. The shoulder screws prevent any rotation between motor mounts which is imperative in keeping the thrust axes of the propeller drives in line with each other. There are many methods, besides a shoulder screw and nut to affix a mount with a spar, or to create a pivot point between a mount and a spar (e.g., screws, bolts, adhesives, pins, retaining rings, press fits etc.).

Figure 8:
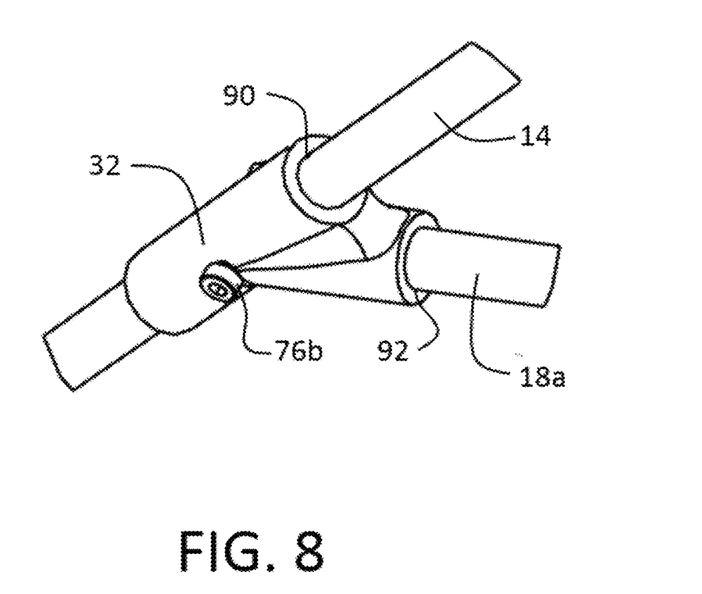
FIG. 8 is an enlarged isometric view of the left spreader connector.

FIG. 8. is an enlarged isometric view of the left spreader connector 32. There is a left spreader connector 32 and a right spreader connector 30 (shown in FIG. 2) because they are mirror images of each other, and the shoulder bolt 76a holes are in mirrored positions. The left spreader connector 32 is affixed to the left leading edge spar 14 using a through hole 90 and a shoulder screw 76b and locking nut (not shown). The spreader spar 18a is affixed to the left spreader connector 32 using a blind hole 92. The compliance in the sheet sail 10 enables the left leading edge spar 14 to be stretched outward in order for the spreader spar 18a to be inserted into the blind hole 92 and for it to stay seated, the same means as a traditional kite spreader spar attachment.

Figure 9:
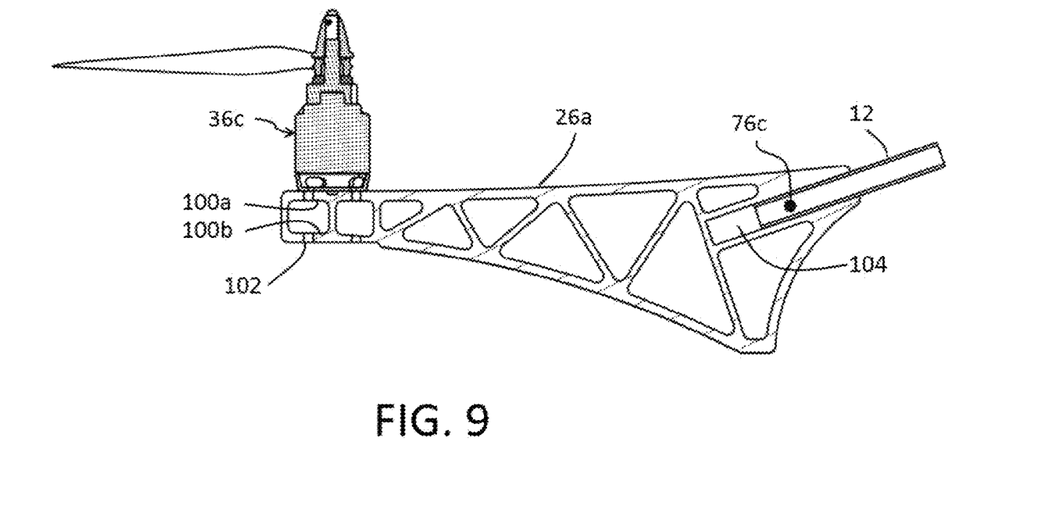
FIG. 9 is an enlarged front section view of the side motor mount.

FIG. 9 is an enlarged front section view of the side motor mount 26a. The propeller drive 36c attachment is similar to the motor attachment in the front motor mount 24, except with just a single motor to attach, the two threaded fasteners (not shown) pass through the holes 102 and through both side mount walls 100a and 100b. The side motor mount 26a is fixated to the right leading edge spar 12 by inserting it into a receiving hole 104. The side motor mount 26a is further secured by inserting a shoulder screw 76c through a cross hole (not shown) whose axis is approximately normal to the receiving hole 104 axis. The shoulder screw 76c is secured using a locking nut (not shown). The propeller drive 36d is affixed to the side motor mount 26b (see FIG. 2), and the side motor mount 26b is affixed to the left leading edge spar 14 in the same manner.

Figure 10:
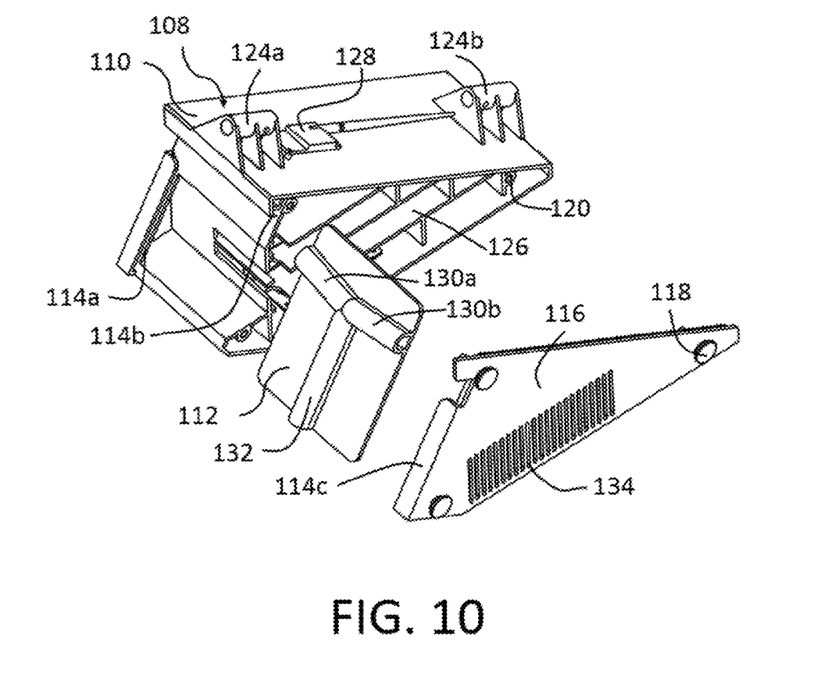
FIG. 10 is an enlarged exploded isometric view of the electronics housing assembly.

FIG. 10 is an enlarged exploded isometric view of the electronics housing assembly 108. The electronics housing 110 is designed as an injection molded part, but could also be a 3D printed part or cast in a lightweight material such as aluminum or titanium. On top of the electronics housing are two spine spar brackets 124a and 124b that contain through holes to attach to the spine spar 16. Mounted between the two spine spar brackets 124a and 124b is a radio controlled receiver 128 that contains an antenna. The radio controlled receiver 128 is used to send control commands and flight status information back to a base station receiver (e.g., 915 MHz 3DR RC Receiver distributed by 3D Robotics).

The electronics housing 110 contains several shelves 126 used to mount additional electronics components. A electronics housing cover 116 is fixated to the electronics housing 110 using three captivated thumb screws 118. These thumb screws 118 screw into threaded inserts 120 that are sonically welded, or adhesively bonded to the electronics housing 110. The threads could may also be directly cut into the plastic bosses in the electronics housing 110.

The spreader spar bracket 112 provides a foot mounting socket 132 for the foot spar 20 and two spreader spar mounting sockets 130a and 130b for the spreader spars 18a and 18b respectively. The spreader spars 18a and 18b and the foot spar 20 use shock cords (not shown) that are tied off inside the spreader spar bracket 112 to captivate the spars, and to prevent their loss during disassembly by the same means as the shock cording used in tent poles. The spreader spar bracket 112 is captivated in the electronics housing 110 by the use of bracket slots 114a, 114b, and 114c in the electronics housing cover 116. Vents 134 may be cut or molded into the electronics housing 110 and electronics housing cover 116 as means of providing air flow to cool heat producing electronics components.

Figure 11:
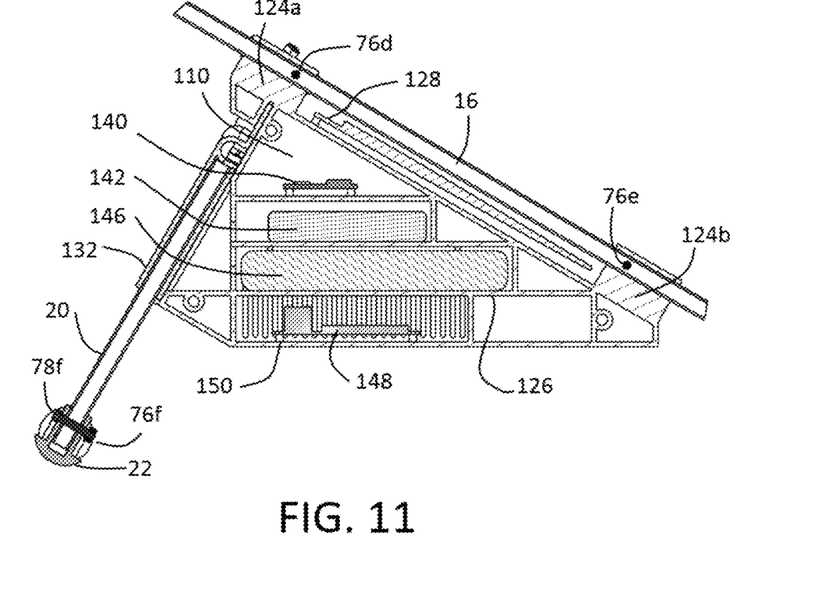
FIG. 11 is an enlarged front section view of the electronics assembly.

FIG. 11 is an enlarged front section view of the electronics assembly 34. The spine spar 16 is fixated to the two spine spar brackets 124a and 124b using two shoulder screws 76d and 76e respectively. The foot 22 is attached to the foot spar 20 using a shoulder screw 76f and locking nut 78f. The electrical components are stacked on the shelves 126 of the electronics housing 110. The bottom shelf may house the power distribution board 148 used to control and distribute the high currents sent to the motors 60 (e.g., Power Distribution Board distributed by 3D Robotics). This board may be mounted on standoffs 150 and small bolts and nuts (not shown). The second shelve may house the battery 146 (e.g., Lipro Power Pack 3s/11.1V 3500 mAh). Since the battery is frequently removed, it may just rest on the shelf and be centered using plastic ribs and foam cushioning (not shown). The third shelf may house the autopilot central processing unit 142 (e.g., Pixhawk PX4 Autopilot distributed by 3D Robotics). The autopilot unit 146 may be attached to the shelf using double backed very high bond (VHB) acrylic foam tape. The forth shelf may house the global positioning module 140 (e.g., 3DR uBlox GPS module distributed by 3D Robotics) and be mounted using standoffs 150 and small bolts and nuts (not shown).

Figure 12:
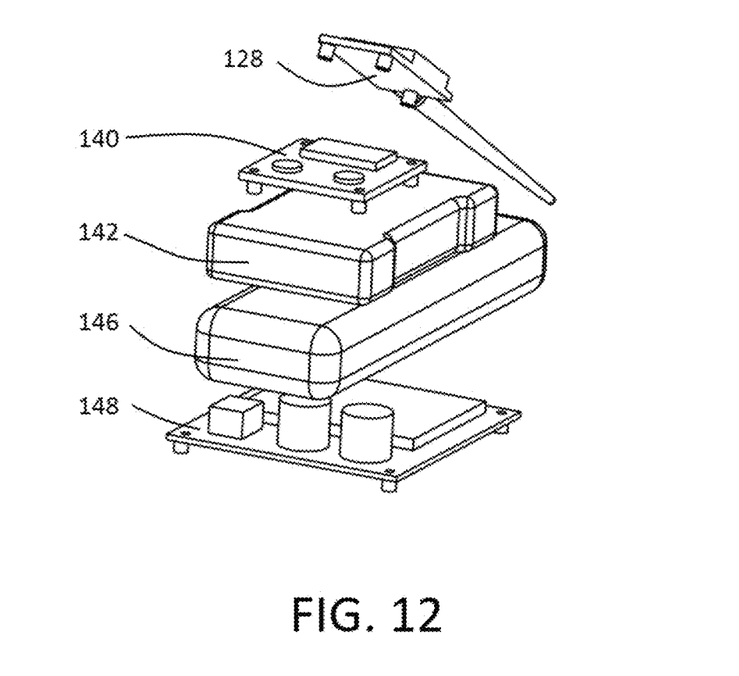
FIG. 12 is an enlarged isometric view of the electronic components.

In order to evenly distribute the weight of all of the electrical components, they may be stacked on top of each other so that the center of mass of each component passes through the plane of symmetry of the invention as shown in FIG. 12. Maintaining symmetry for all of the components in the invention ensures a balanced weight distribution during flight.

Figure 13:
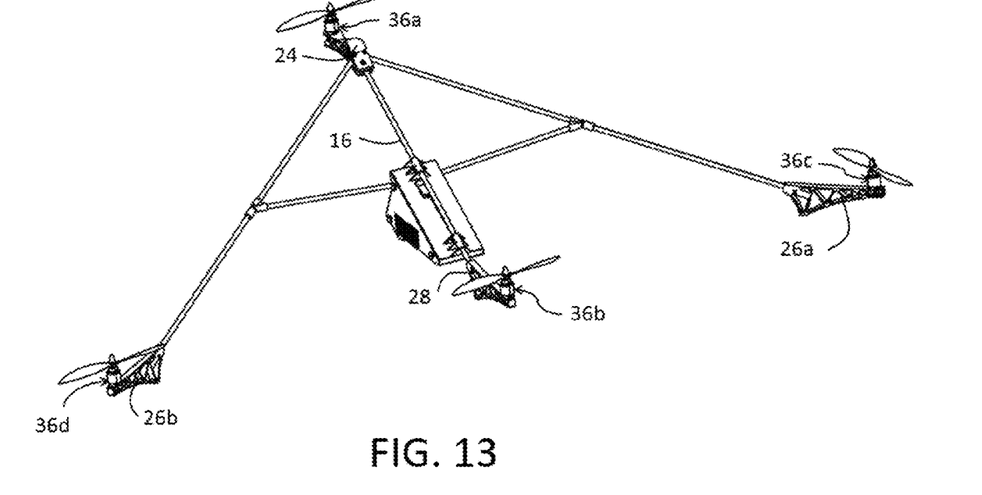
FIG. 13 is a rear isometric view of another embodiment of the vertical takeoff winged multicopter with a rear mounted propeller drive.

FIG. 13 is a rear isometric view of another embodiment of the vertical takeoff winged multicopter with a rear mounted propeller drive 36b. The propeller drive 36b is mounted to the rear motor mount 28. The rear motor mount 28 is fixated to the back of the spine spar 16 using the same shoulder screw fixation method as the side mounts 26a and 26b. Additional embodiments may use two propeller drives at each mounting site and combinations thereof. All of these combinations are within the scope of the invention.

Figure 14:
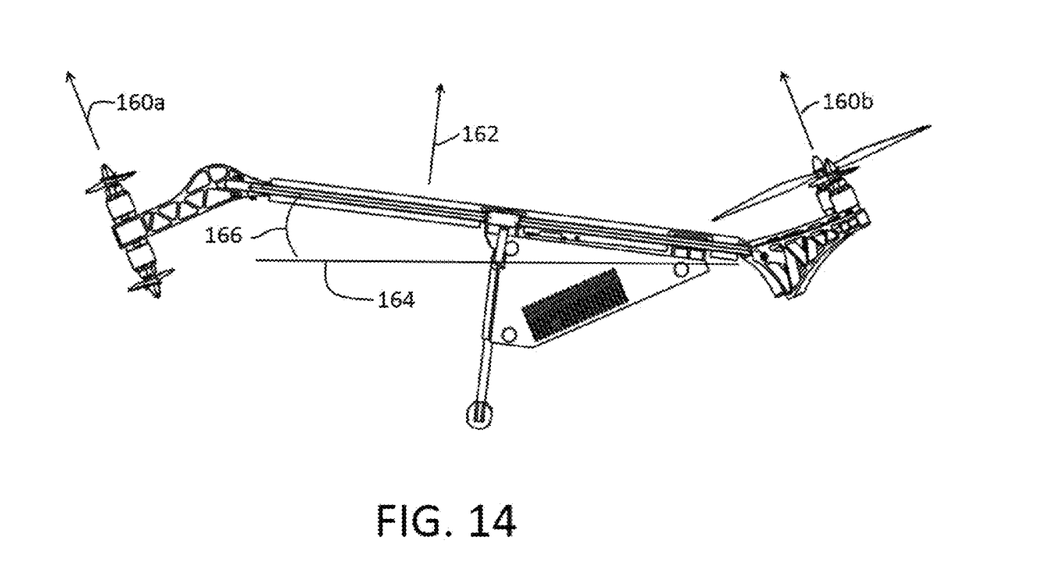
FIG. 14 is a front view of the vertical takeoff winged multicopter in the forward thrust position.

FIG. 14 is a front view of the vertical takeoff winged multicopter in the forward thrust position. After the vertical takeoff winged multicopter has vertically ascended to cruising altitude in the position shown in FIG. 3, the frame tilts towards the direction of forward motion and the propeller thrust direction 160a and 160b changes from a purely vertical direction to a forward tilted position where a component of the thrust is vertical and a component of the thrust is in the horizontal forward thrust direction in the exact manner as a conventional multicopter. The sheet sail attack angle from horizontal 166 is the angle of the sheet sail 10 relative to the horizontal ground angle 164 during forward motion. This angle decreases as the vertical takeoff winged multicopter tilts forward, but it remains a positive angle (e.g., 5 to 20 degrees) in order to create a lift force 162 during forward motion. The sheet sail design angle from horizontal 168 (shown in FIG. 3) may be tuned to create the optimum lift force 162 for a target cruising speed.

What is claimed is:

1. An unmanned aerial vehicle assembly, comprising:
   a plurality of propeller drives each comprising a propeller attached to an electric motor;
   a rigid frame comprising leading edge spars;
   said plurality of propeller drives being mounted on said rigid frame;
   said electric motors each having a rotor axes oriented in a vertical direction thereby providing a means of vertical ascent;
   a sheet sail mounted to said rigid frame;
   wherein said sheet sail is angled from horizontal when said vehicle is at rest and said sheet sail provides lift during forward motion of said unmanned aerial vehicle.

2. The unmanned aerial vehicle assembly of claim 1, wherein said frame and said sheet sail can be folded into a more compact shape by rotating the leading edge spars together after the detachment of one or more spreader spars.

3. The unmanned aerial vehicle assembly of claim 1, wherein,
   said frame has a triangular shape resulting in a leading edge vertex and two trailing edge vertices;
   with at least one of said propeller drives being mounted in close proximity to the leading edge vertex and at least one of said propeller drives being mounted to each of said trailing edge vertices.

4. The unmanned aerial vehicle assembly of claim 3 wherein,
   at least one of said propeller drives is mounted in between said propeller drives mounted proximate said trailing edge vertices.

* * * * *